(12) United States Patent
Karl et al.

(10) Patent No.: US 8,385,074 B2
(45) Date of Patent: Feb. 26, 2013

(54) DISPLAY DEVICE

(75) Inventors: Klaus Karl, Gelnhausen (DE); Robert Wolfgang Kissel, Egelsbach (DE); Georg Nehm, Niedernberg (DE)

(73) Assignee: Continental Automotive GmbH, Hannover (DE)

( * ) Notice: Subject to any disclaimer, the term of this patent is extended or adjusted under 35 U.S.C. 154(b) by 253 days.

(21) Appl. No.: 12/992,748

(22) PCT Filed: May 7, 2009

(86) PCT No.: PCT/EP2009/055527
§ 371 (c)(1),
(2), (4) Date: Dec. 9, 2010

(87) PCT Pub. No.: WO2009/138353
PCT Pub. Date: Nov. 19, 2009

(65) Prior Publication Data
US 2011/0141702 A1    Jun. 16, 2011

(30) Foreign Application Priority Data
May 14, 2008   (DE) .......................... 10 2008 023 469

(51) Int. Cl.
*H05K 7/16*  (2006.01)
*H05K 7/00*  (2006.01)
*H05K 5/00*  (2006.01)
*H01R 13/62* (2006.01)

(52) U.S. Cl. .................... 361/726; 361/727; 361/679.57; 361/679.58; 361/679.41; 361/679.42; 361/679.43; 439/153; 439/327

(58) Field of Classification Search .. 361/679.31–679.4, 361/679.55, 679.58, 724–727, 679.01–679.04, 361/679.31–679.45; 439/157, 60, 152–153, 439/327, 328, 331
See application file for complete search history.

(56) References Cited

U.S. PATENT DOCUMENTS

| | | | |
|---|---|---|---|
| 4,569,461 A * | 2/1986 | Orr | 221/1 |
| 7,304,836 B2 * | 12/2007 | Nakamura et al. | 361/679.27 |
| 7,685,901 B2 | 3/2010 | Leopold et al. | |
| 2002/0101117 A1 * | 8/2002 | Shibuya | 307/9.1 |
| 2009/0090476 A1 | 4/2009 | Grandel et al. | |

FOREIGN PATENT DOCUMENTS

| | | |
|---|---|---|
| DE | 10008887 A1 | 10/2001 |
| DE | 102005023578 B3 | 10/2006 |
| DE | 102005052031 A1 | 5/2007 |
| DE | 102005062316 A1 | 6/2007 |
| JP | 11007263 A | 1/1999 |
| WO | WO 2007137998 A1 | 12/2007 |

\* cited by examiner

*Primary Examiner* — Jayprakash N Gandhi
*Assistant Examiner* — Jerry Wu
(74) *Attorney, Agent, or Firm* — Cozen O'Connor

(57) ABSTRACT

A display unit for displaying information including a housing having an opening and a display unit with a display, moveable between a rest position in which the display unit is completely retracted into the housing and a display position in which the display unit is extended from the housing. A cover is moveably driven between a cover position that covers the housing opening and a release position releasing the housing opening. The display unit and the cover can be moveably driven by way of a coupling assembly by a rotary drive. The coupling assembly couples the motion of the display unit and the cover. The coupling assembly includes a first coupler that can rotate about a fixed first axis of rotation with a free end of hinged to the cover. The display unit is hinged to a free end of a second coupler by a second linkage at the cover and at distances from the first linkage and the second linkage by a third linkage.

14 Claims, 13 Drawing Sheets

DISPLAY DEVICE

PRIORITY CLAIM

This is a U.S. national stage of Application No. PCT/EP2009/055527, filed on May 7, 2009, which claims priority to German Application No: 10 2008 023 469.9, filed: May 14, 2008, the contents of which are incorporated herein by reference.

BACKGROUND OF THE INVENTION

1. Field of the Invention

The invention relates to a display device for displaying information, in particular information for a vehicle, having a housing which has a housing opening and having a display unit which has a display and which can be movably driven between a rest position, in which the display unit is fully retracted into the housing, and a displaying position, in which the display unit is deployed out of the housing into an at least approximately vertical position of its display, having a cover which can be movably driven between a covering position, in which it covers the housing opening, and an opened-up position in which it opens up the housing opening, having a coupler which can be driven by a rotary drive and by which the display unit and the cover can be movably driven and with which the movements of the display unit and of the cover can be coupled.

2. Related Art in the case of a known display device which is used in particular in the instrument panel of a motor vehicle, the coupler has a multiplicity of pivot levers and rockers, and are therefore constructed with a large number of components, which also entails considerable assembly expenditure and installation space.

By way of the coupler, the display unit and the cover perform combined rotational and translatory movements in order to pass from the rest position, or covering position, into the displaying position or opened-up position.

SUMMARY OF THE INVENTION

It is an object of the invention to provide a display device of the type specified in the introduction, which is composed of a small number of simple components.

According to one embodiment of the invention a coupling assembly has a first coupler that is rotatable about a positionally fixed first rotary axle and whose free end is articulatedly connected to the cover by a first articulated joint, with the display unit being articulatedly connected by a second articulated joint to the cover at a distance from the first articulated joint of the first coupler, and being articulatedly connected by a third articulated joint to the free end of a second coupler at distances from the first articulated joint and from the second articulated joint, which second coupler is pivotable with its other end about a second rotary axle which is positionally fixed in relation to the first rotary axle.

By this design, both the display unit and also the cover are components of the common coupling assembly, as a result of which only a small number of simply designed parts are required for the integrated movement drive of the display unit and cover by a single rotary drive.

In particular, if coupling elements, which are connected to one another here, are provided doubly parallel to and at a distance from one another, the display unit and cover are not only movably driven but rather also supported by the coupling elements, such that no brackets and guides of the display unit and cover are required on the housing.

This makes it possible for the coupling elements to be arranged on that side of the display unit that faces away from the housing opening. As a result a view into the housing and of the coupling elements from the viewer's side is blocked.

Since the coupling elements need not be situated in the side regions of display unit and cover, small gaps adjacent to the display unit are possible.

Furthermore, the installation space requirement is very low in that the display unit, in the rest position, is situated in an approximately horizontal position, from which it can be moved by a rotational and translatory movement into the displaying position, wherein at the same time the cover is also moved by a rotational and translatory movement from the covering position into the opened-up position.

All the rotary axles and articulated joints are aligned parallel to one another.

A coupler can be articulatedly connected with one of its ends by a fourth articulated joint to the cover between the first articulated joint and the second articulated joint, the other end of which coupler is freely rotatable about a positionally fixed third rotary axle and forms a four bar linkage with the first coupler, the cover and the third coupler, as a result of which the movement profile is clearly defined.

Depending on the available installation space, it may be provided that one of the couplers of the coupling assembly can be driven in rotation by the rotary drive.

It is however also possible for a first gearwheel to be arranged on the first coupler, for conjoint rotation therewith, coaxially with respect to the first rotary axle and for a second gearwheel to be arranged on the second coupler, for conjoint rotation therewith, coaxially with respect to the second rotary axle, and for the rotational movement of the first gearwheel to be transmitted via a rotatably mounted intermediate wheel to the second gearwheel, wherein, in a simple manner, the gearwheels and the intermediate wheel form a spur gearing.

Said gearing coupling likewise results in positive coupling with a restriction in degrees of freedom, as a result of which the movement profile is clearly defined.

In order to be hidden from an observer by the display unit, the first, second and third couplers or the first and second couplers and also the gearwheels and the intermediate wheel may be arranged in the housing on that side of the display unit that faces away from the housing opening.

It is possible for the rotary drive to be an electromotive rotary drive, which can be driven in rotation both in the opening and closing directions, or else only in the opening direction. In the second case, the closing movement could take place by manual exertion of force on the cover.

It is however significantly cheaper for the rotary drive to be a spring drive, in particular a torsion spring drive, by which the first rotary axle is spring-loaded in the opening drive direction of the cover.

Closing is effected manually by pulling the cover, as a result the display unit also automatically moves into the rest position as a result of the coupling of the movements. Here, the spring drive is simultaneously tensioned.

To hold the cover in the covering position, one of the components of the coupling assembly can be locked in the rest position of the display unit or in the covering position of the cover by a manually unlockable locking device, wherein to open the cover and deploy the display unit, the locking device can be unlocked by a button arranged on the housing or on the cover.

The display unit is held stably in the displaying position, so as to be unsusceptible to vibration if the displaying position of the display unit is defined by a stop against which the display unit abuts in the displaying position, and which delimits the deploying movement of the display unit.

For this purpose, in a simple design, the display unit may have a stop peg that extends transversely with respect to the deploying movement of the display unit and which, with the deploying movement of the display unit, can be moved in a longitudinal groove, one end of which forms the stop against which the stop peg abuts in the displaying position.

BRIEF DESCRIPTION OF DRAWINGS

Exemplary embodiments of the invention are illustrated in the drawings and described in more detail below. In the drawings.

DETAILED DESCRIPTION OF THE DRAWINGS

Figure 1:
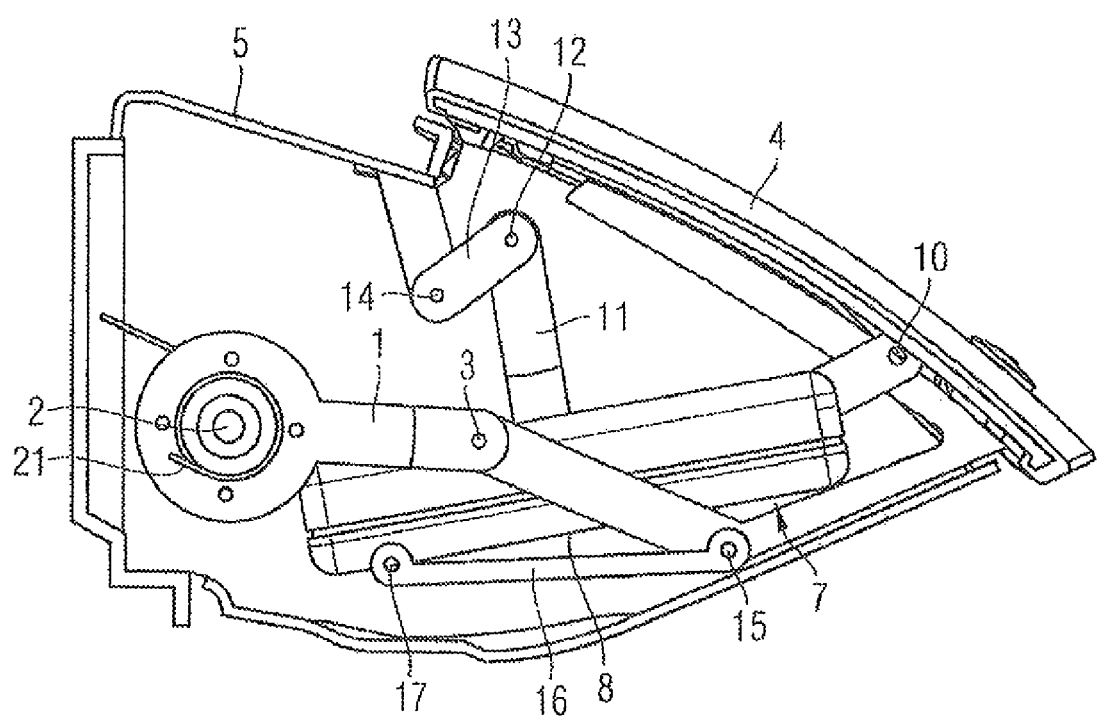
FIG. 1 is a side view, with open housing, of a first exemplary embodiment of a display device with a cover in a covering position.

The display units illustrated in the figures have a housing 5 with a housing opening that has a rectangular cross section that can be closed off by a corresponding areal cover 4.

The cover 4 can be movably driven by a coupling assembly between a rest position, in which the housing opening 6 is closed off (FIGS. 1, 4, 7, 10), and an opened-up position, in which the housing opening 6 is open (FIGS. 3, 6, 9, 12).

The cover 4 is coupled by the coupling assembly to a display unit 7, which can be moved from a rest position (FIGS. 1, 4, 7, 10), in which the box-shaped display unit 7, which has a display 8, is situated approximately horizontally and entirely in the housing 5, into a displaying position (FIGS. 3, 6, 9, 12).

Here, a combined rotational and translatory movement of the display unit 7 takes place, such that the latter is moved from the approximately horizontal rest position out of the housing opening 6 and into its approximately vertical displaying position, in which the display 8 is directed towards an observer 9.

The coupling assembly has a coupler 1, which is mounted with one of its ends so as to be pivotable about a positionally fixed first rotary axle 2.

At its free end, the first coupler 1 is articulatedly connected by a first articulated joint 3 to the cover 4.

The display unit 7 is articulatedly connected at its upper edge region by a second articulated joint 10 to the cover 4 at a distance from the first articulated joint 3.

In its lower region, at a distance from the second articulated joint 10, the display unit 7 has, projecting on its side facing away from the display 8, an arm 11, and a second coupler 13 is articulatedly connected with one of its ends by a third articulated joint 12 to the free end of said arm 11, which second coupler 13 is mounted with its other end so as to be pivotable about a positionally fixed second rotary axle 14.

A preloaded torsion spring 21 engages on the first rotary axle 2, by which torsion spring 21 the first coupler 1 can be driven in rotation counterclockwise.

In the rest position of the display unit 7, in which the cover 4 is situated in its covering position, the cover 4 is locked by a locking device (not shown).

Said locking device may be unlocked by manually actuating a button 22 (FIG. 7) arranged on the cover 4, such that then the preload force of the torsion spring 21 via the coupling assembly causes the cover 4 to be moved out of the covering position into its opened-up position in which the housing opening 6 is opened up, and the display unit 7 to be moved out of its rest position into its displaying position.

It is self-evident that the spring drive by the torsion spring 21 may also act on a second coupler 13 instead of on the first coupler 1, in order to generate the same opening and deploying movement.

To retract the display unit 7 and close the housing opening 6 by the cover 4, the cover 4 is pulled manually into its covering position until the locking device locks the cover again and holds the cover 4 in its covering position. Here, the torsion spring 21 is simultaneously tensioned again.

Figure 2:
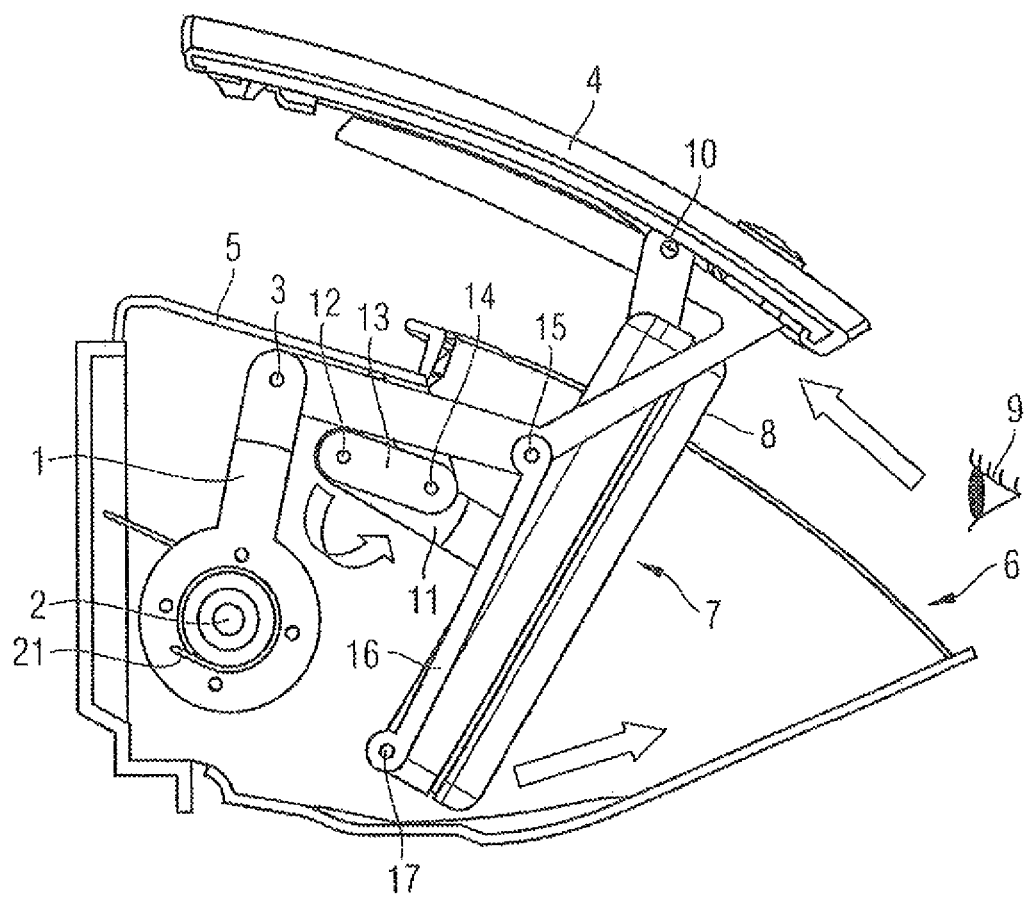
FIG. 2 is a side view of the display device according to FIG. 1 with the cover in a semi-open position.
Figure 3:
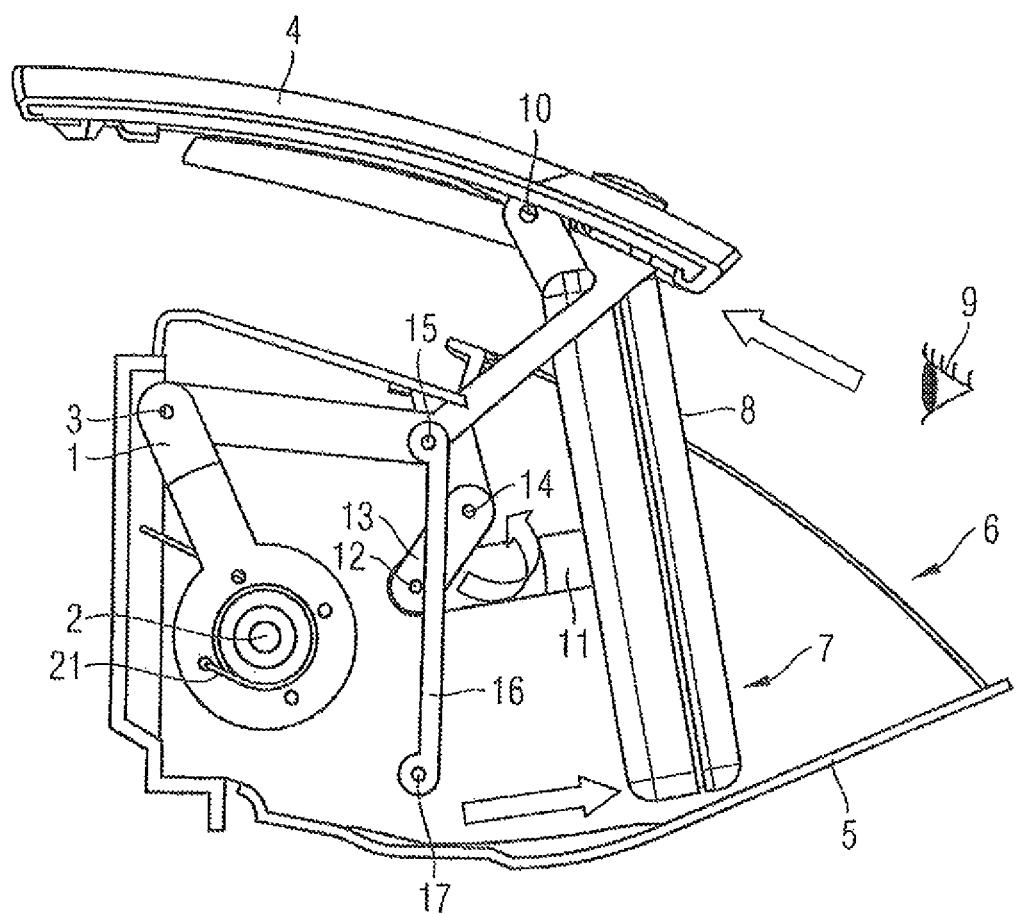
FIG. 3 is a side view of the display device according to FIG. 1 with the cover in an opened-up position.
Figure 4:
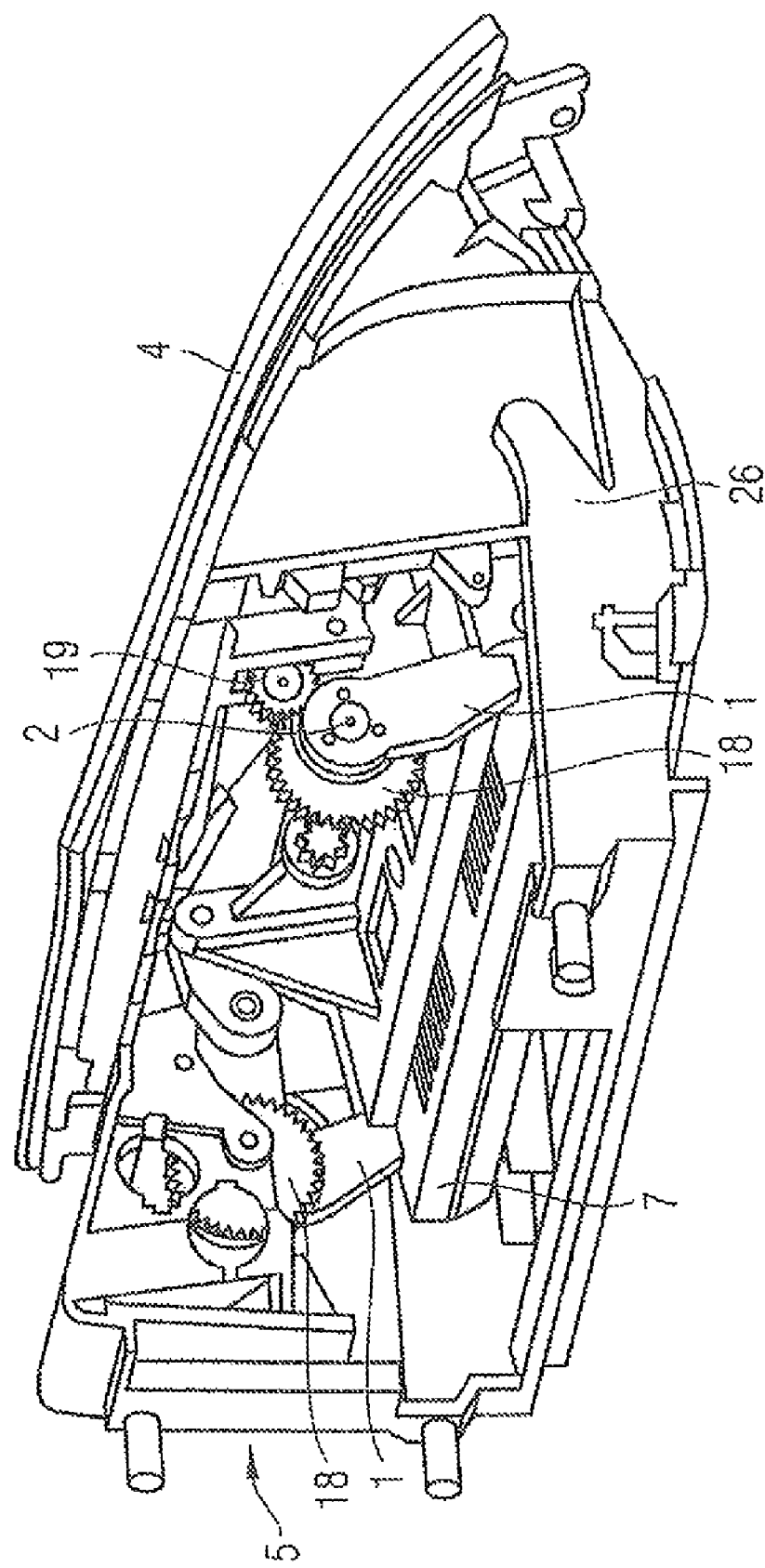
FIG. 4 shows a perspective rear view of a second exemplary embodiment of a display device with a cover in a covering position.
Figure 5:
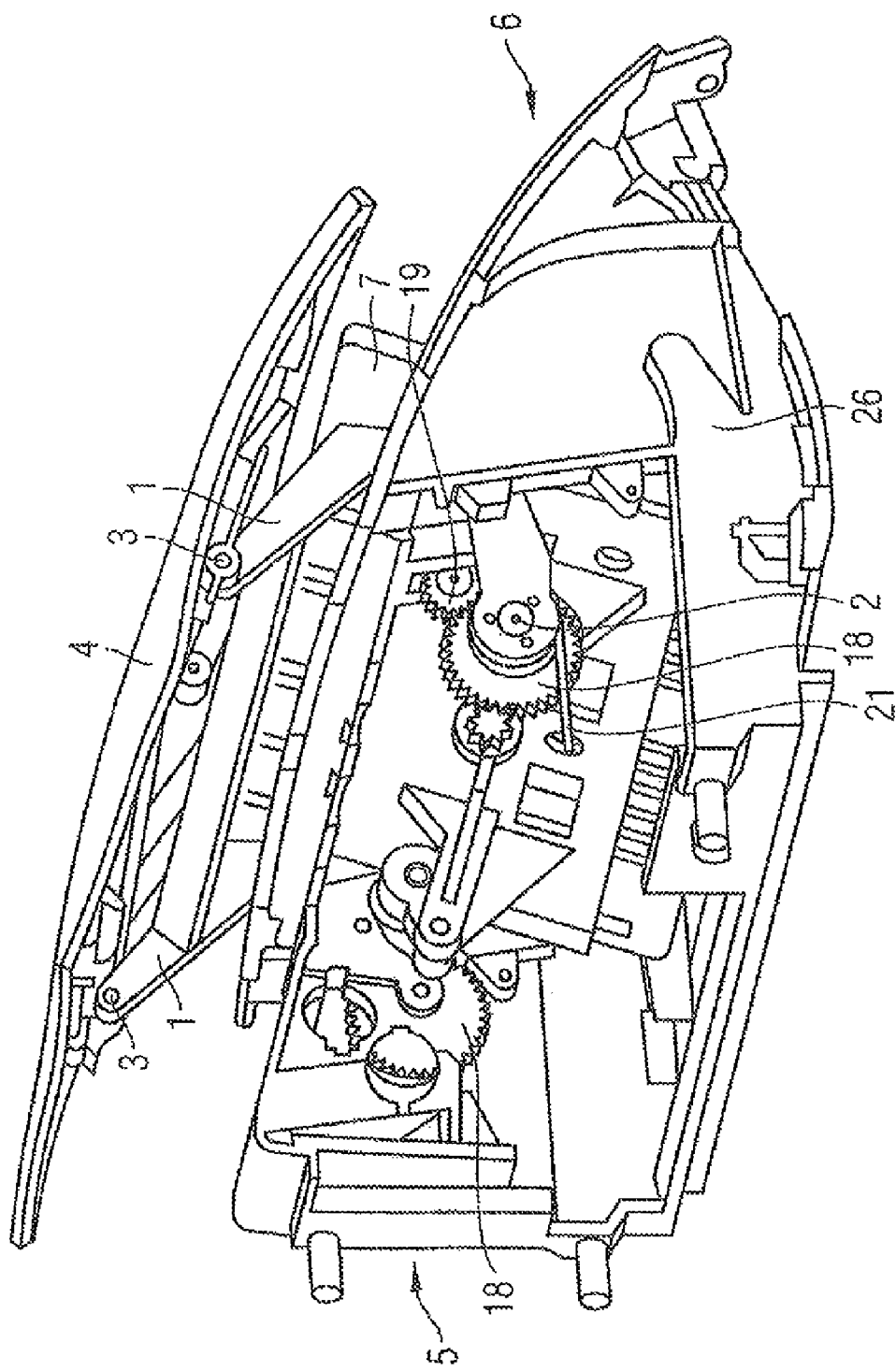
FIG. 5 is a perspective rear view of the display device according to FIG. 4 with the cover in a semi-open position.
Figure 6:
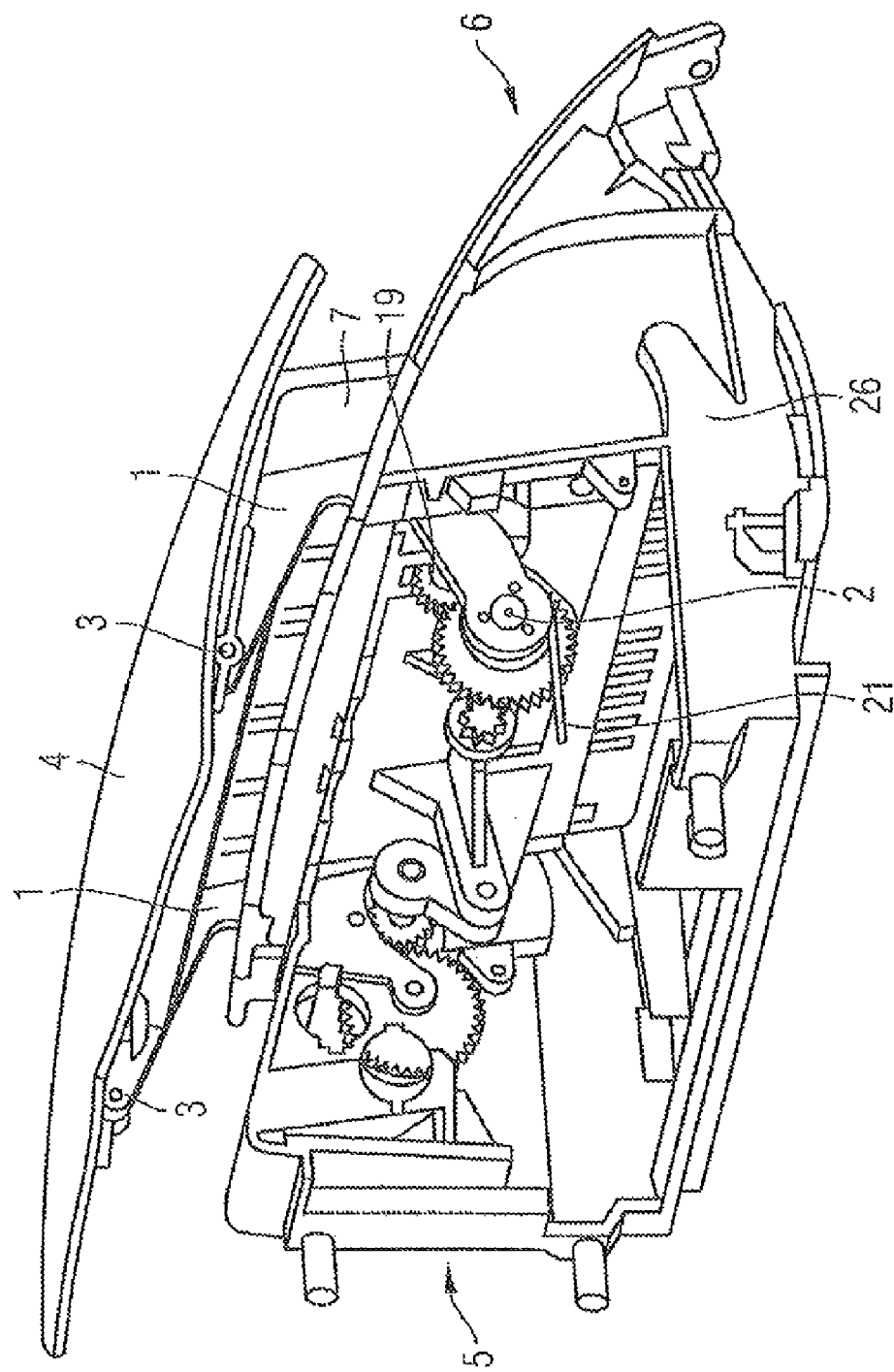
FIG. 6 is a perspective rear view of the display device according to FIG. 4 with the cover in an opened-up position.

In the exemplary embodiment of FIGS. 1 to 3, a third coupler 16 is articulatedly connected with one of its ends of a fourth articulated joint 15 to the cover 4 between the first articulated joint 3 and the second articulated joint 10. The other end of the third coupler 16 is rotatable about a positionally fixed third rotary axle 17.

Here, the first coupler 1, the cover 4 and the third coupler 16 form a four bar linkage.

Instead of driving the first coupler 1 or the second coupler 13, the spring drive by the torsion spring 21 may also act on the third coupler 16 to generate an opening and deploying movement.

Figure 7:
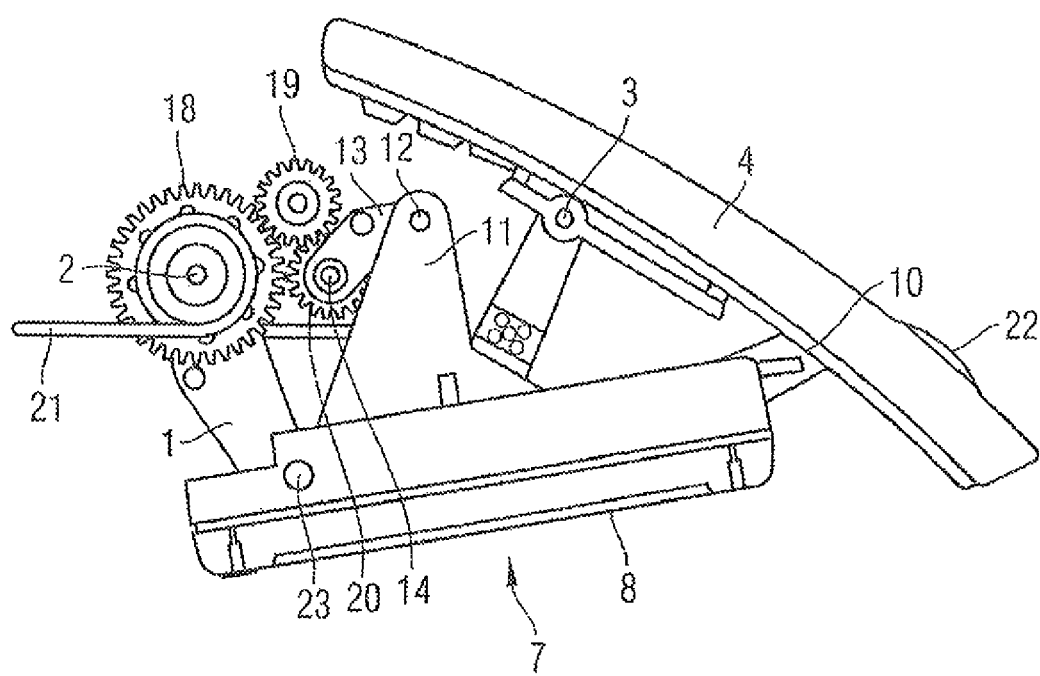
FIG. 7 is a side view of the cover, display unit and coupling assembly of the display device according to FIG. 4 with the cover in a covering position.
Figure 8:
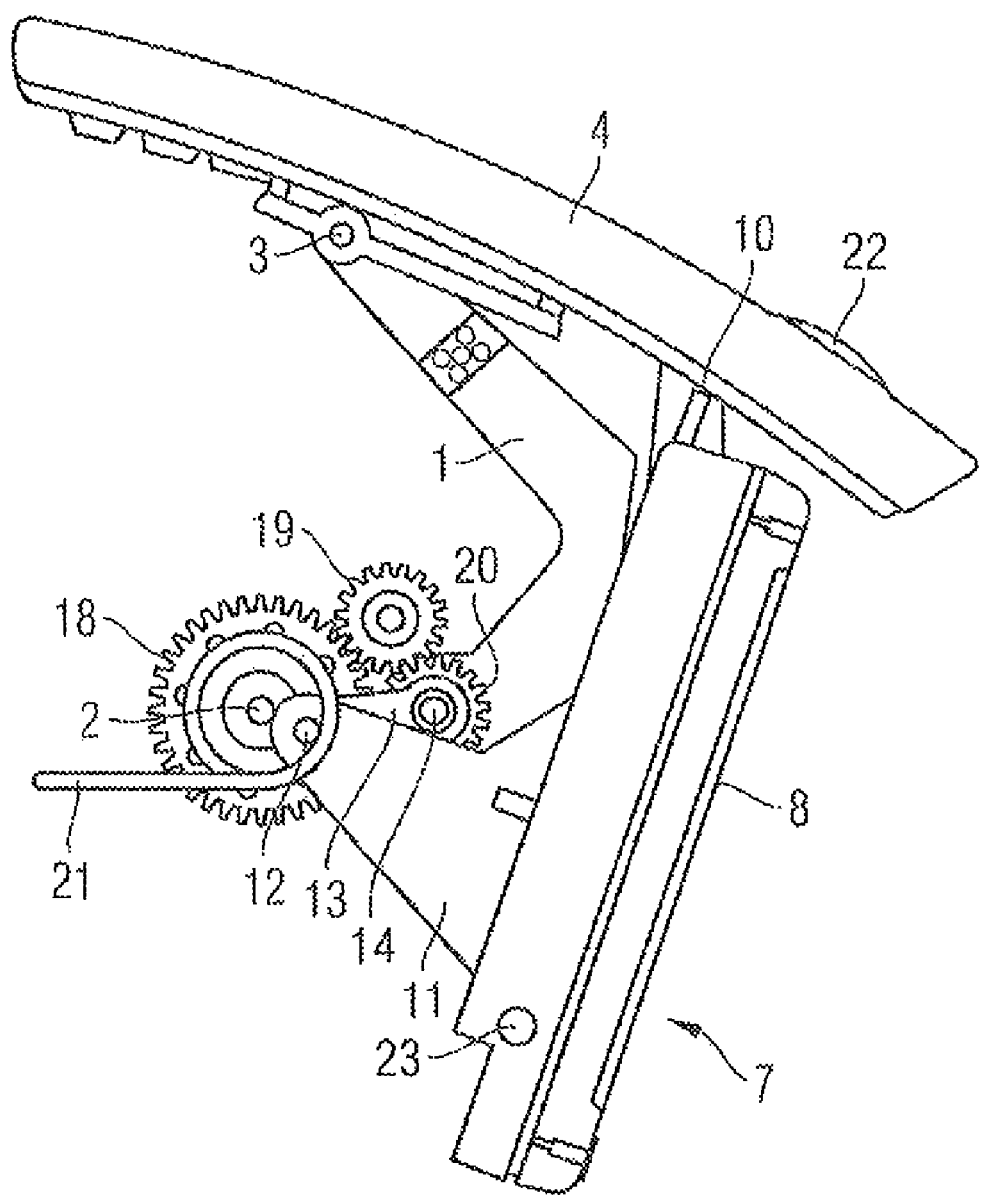
FIG. 8 shows a side view of the cover, display unit and coupling assembly of the display device according to FIG. 4 with the cover in a semi-open position.
Figure 9:
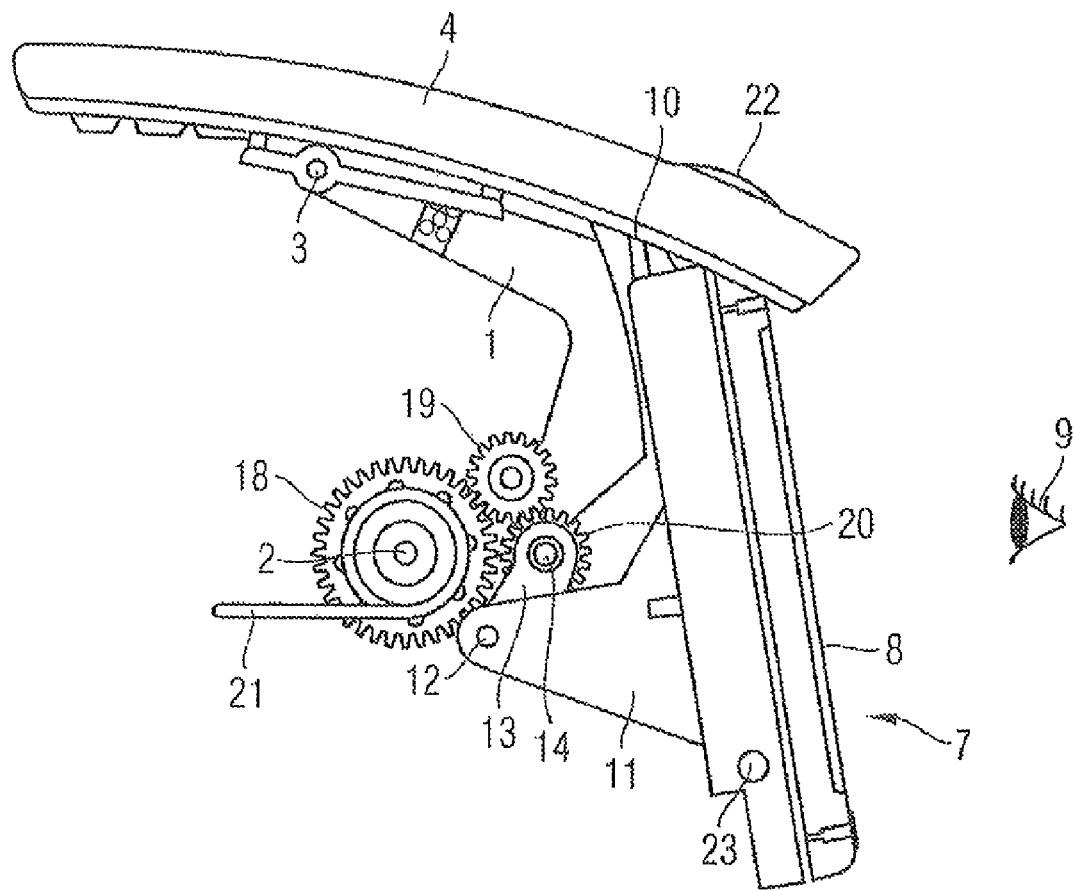
FIG. 9 shows a side view of the cover, display unit and coupling assembly of the display device according to FIG. 4 with the cover in an opened-up position
Figure 10:
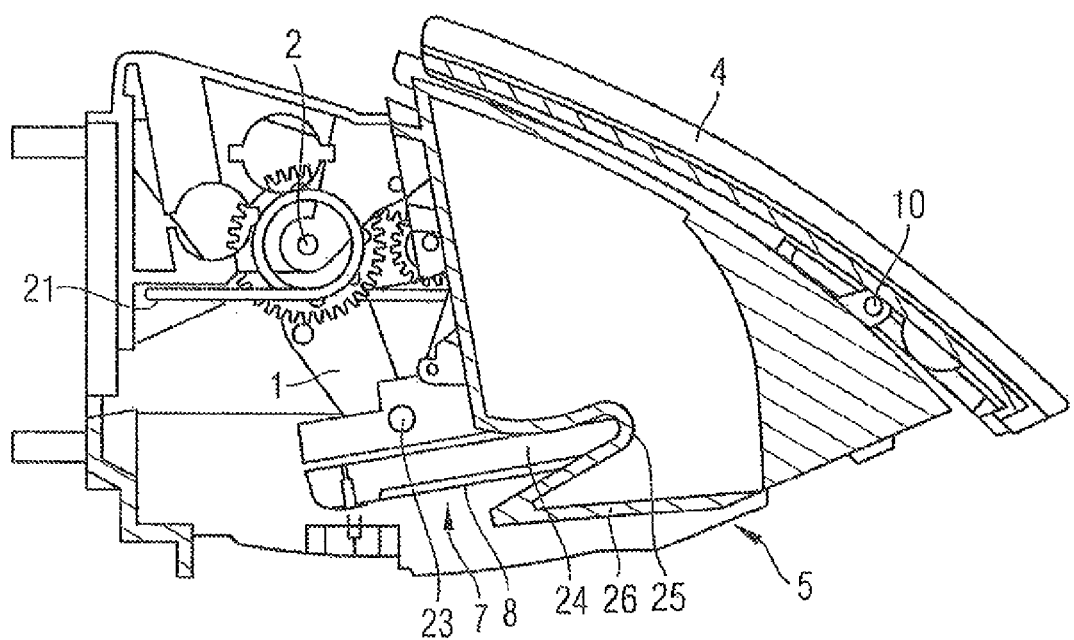
FIG. 10 is a side view of the display device according to FIG. 4 with the cover in a covering position.
Figure 11:
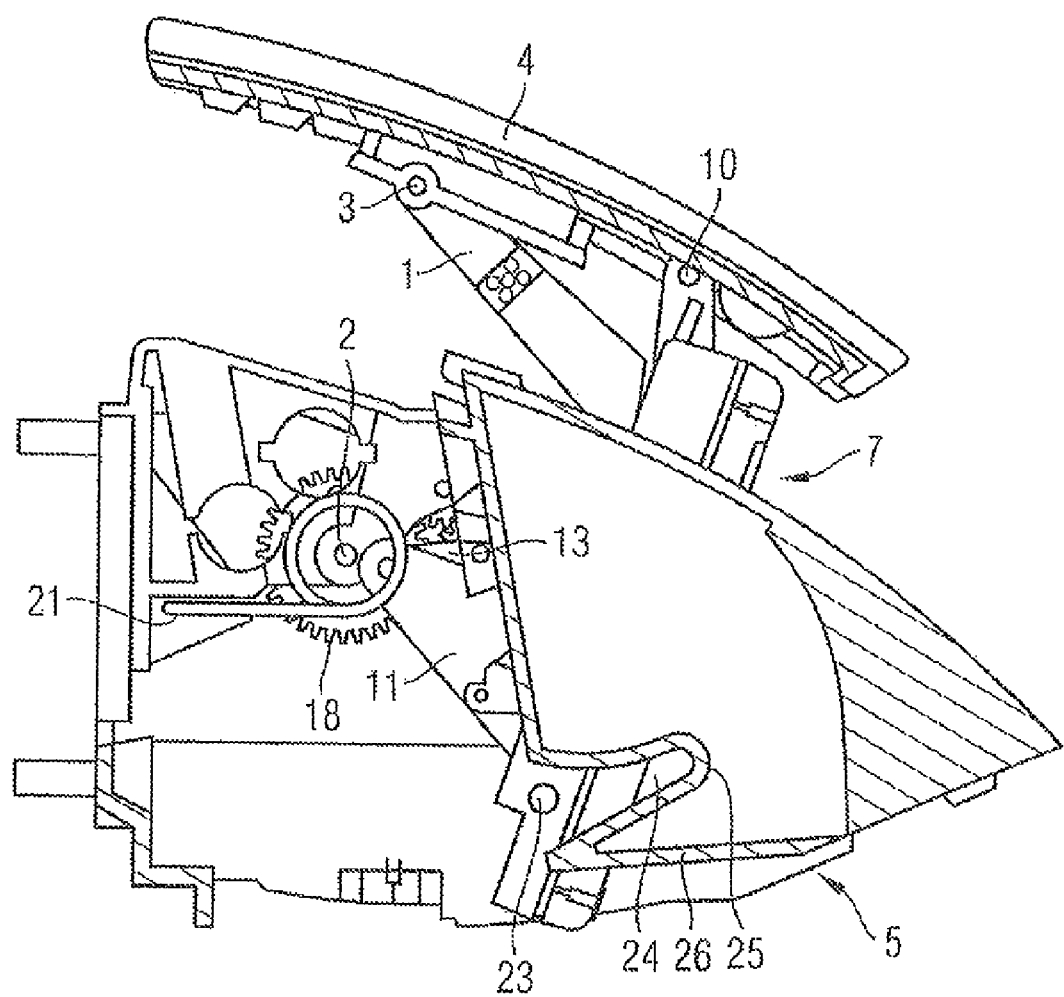
FIG. 11 is a side view of the display device according to FIG. 4 with the cover in a semi-open position.
Figure 12:
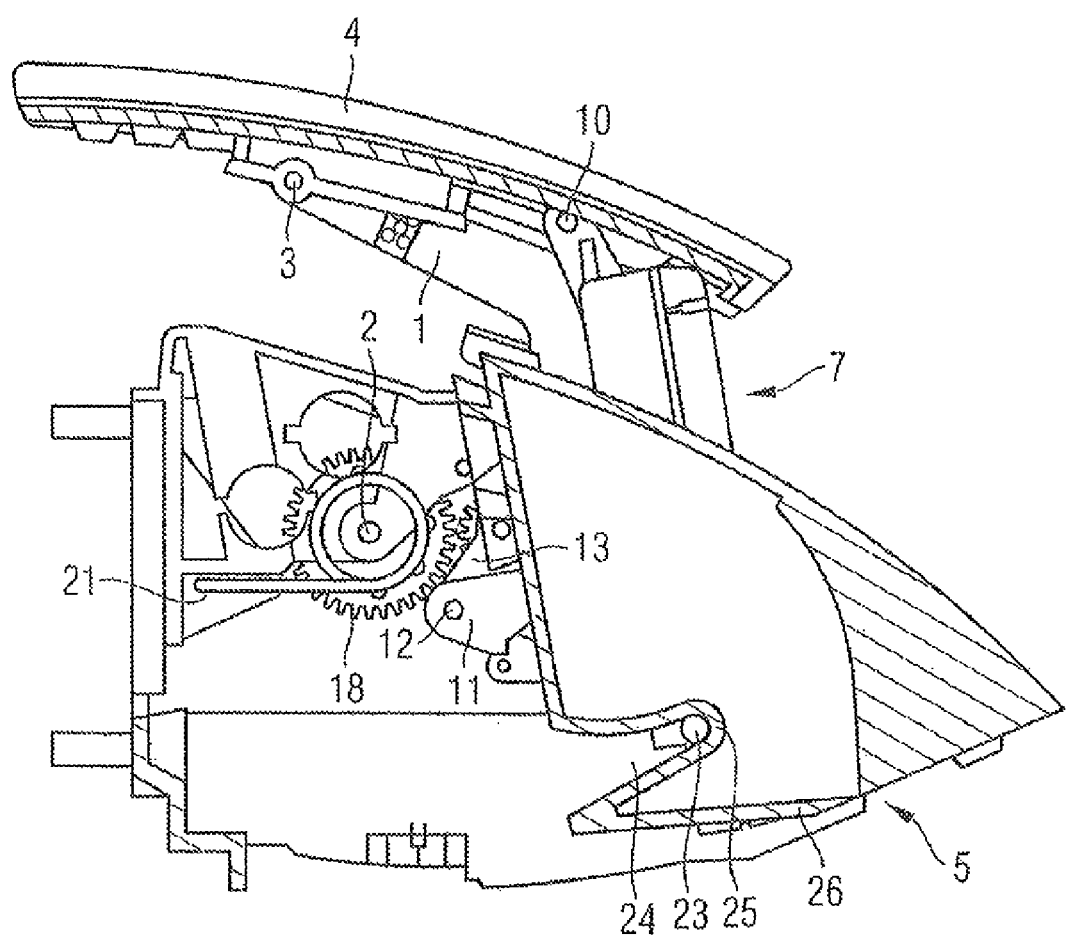
FIG. 12 is a side view of the display device according to FIG. 4 with the cover in an opened-up position.
Figure 13:
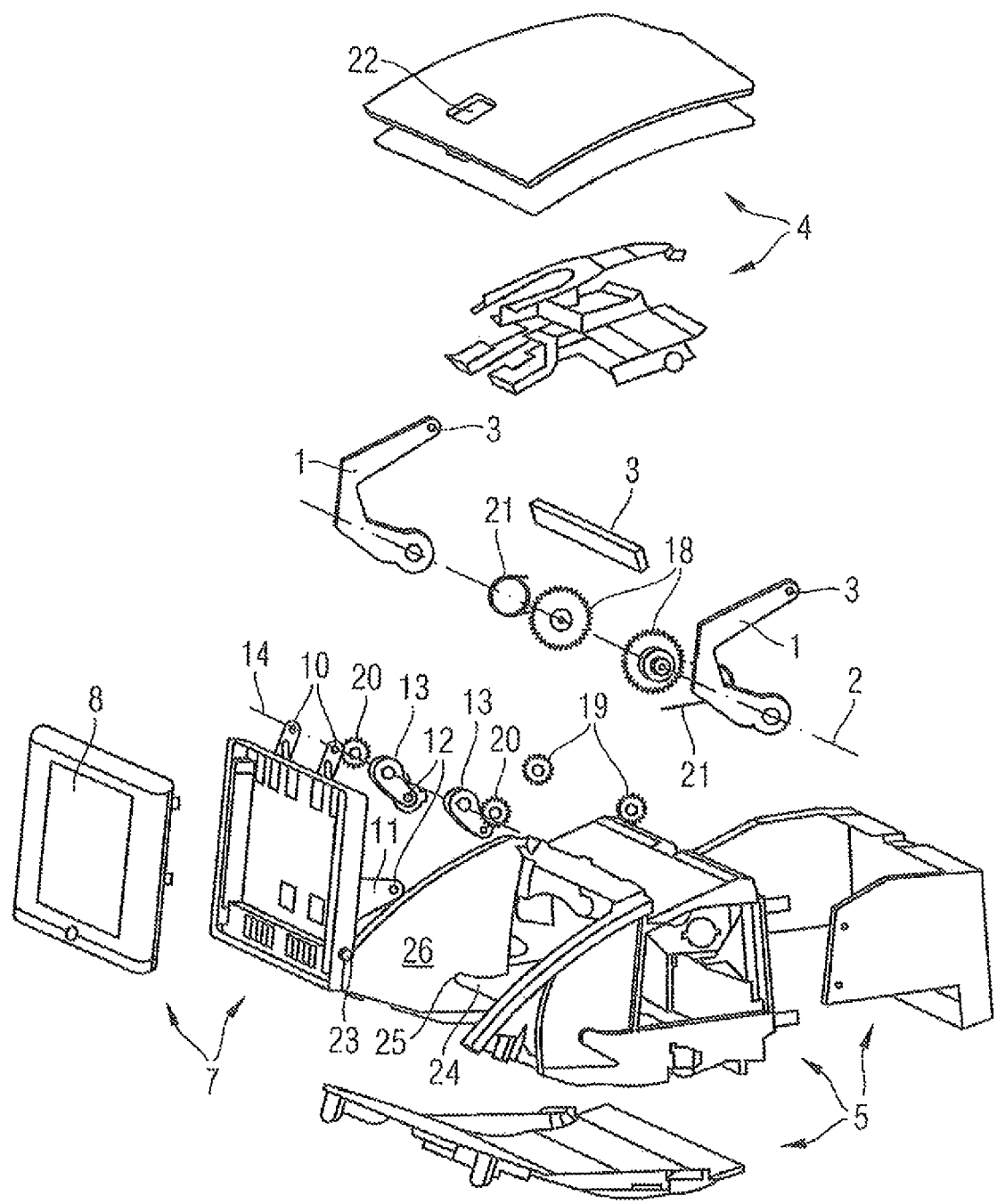
FIG. 13 is a perspective exploded illustration of the display device according to FIG. 4.

In the exemplary embodiment of FIGS. 4 to 13, a drive input spur gearwheel 18 is arranged on the first rotary axle 2 for conjoint rotation therewith, which drive input spur gearwheel 18, via a freely rotatably mounted intermediate spur gearwheel 19, drives a drive output spur gearwheel 20 which is arranged on the second rotary axle 14 for conjoint rotation therewith, shown in FIG. 7.

In the lower end region of the display unit 7, stop pegs 23 project therefrom at both sides transversely with respect to the deploying movement, which stop pegs 23, in the final part of the deploying movement, move along their longitudinal extent in longitudinal grooves 24 (FIG. 10) until they abut against closed ends, which form stops 25, of the longitudinal grooves 24. The displaying position of the display unit 7 is thereby also reached. The longitudinal grooves 24 are formed in the side walls 26 of the box-shaped housing 5.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A display device for displaying information in a vehicle, comprising: a housing having a housing opening;
 a display unit comprising a display movable between a rest position, in which the display unit is fully retracted into the housing, and a displaying position, in which the display unit is deployed out of the housing into an at least approximately vertical position of its display;
 a cover movable between a covering position, wherein the cover covers the housing opening, and an opened-up position, wherein the cover opens up the housing opening; a rotary drive; and a coupling assembly that is driven by the rotary drive, the coupling assembly arranged to moveably drive the display unit and the cover, the coupling assembly comprising:
 a first coupler having a first end rotatable about a positionally fixed first rotary axle and a free end articulately coupled to the cover by a first articulated joint at the free end;
 a second articulated joint articulately connecting the display unit to the cover at a first distance from the first articulated joint of the first coupler;
 a second coupler pivotable at a first end about a second rotary axle that is positionally fixed in relation to the first rotary axle; and a third articulated joint articulately connected to a second end of the second coupler opposite the first end of the second coupler, at a second distance from the first articulated joint and at a third distance from the second articulated joint.

2. The display device as claimed in claim 1, further comprising:
 a third coupler articulatedly connected at a first end by a fourth articulated joint to the cover arranged between the first articulated joint and the second articulated joint, a second end of the third coupler is freely rotatable about a positionally fixed third rotary axle forming a four bar linkage with the first coupler, the cover and the third coupler.

3. The display device as claimed in claim 2, wherein at least one of the first, second, and third couplers is driven in rotation by the rotary drive.

4. The display device as claimed in claim 1, further comprising:
 a first gearwheel arranged on the first coupler, for conjoint rotation therewith, coaxially with respect to the first rotary axle;
 a second gearwheel arranged on the second coupler, for conjoint rotation therewith, coaxially with respect to the second rotary axle; and
 a rotatably mounted intermediate wheel arranged to transmit rotational movement of the first gearwheel to the second gearwheel.

5. The display device as claimed in claim 4, wherein the first and second gearwheels and the intermediate wheel form a spur gearing.

6. The display device as claimed in claim 4, wherein the first, second and third couplers, the first and second gearwheels, and the intermediate wheel are arranged in the housing on a side of the display unit that faces away from the housing opening.

7. The display device as claimed in claim 1, wherein the rotary drive is an electromotive rotary drive.

8. The display device as claimed claim 1, wherein the rotary drive is a spring drive by which the first rotary axle is spring-loaded in the opening drive direction of the cover.

9. The display device as claimed in claim 8, further comprising:
 a manually unlockable locking device configured to lock the coupling assembly in at least one:
 the rest position of the display unit and
 the covering position of the cover.

10. The display device as claimed in claim 9, further comprising:
 a button arranged on one of the housing and the cover configured to unlock the manually unlockable locking device.

11. The display device as claimed in claim 1, further comprising
 a stop against which the display unit abuts in the displaying position and which delimits the deploying movement of the display unit,
 wherein the displaying position of the display unit is defined by the stop.

12. The display device as claimed in claim 11, wherein the display unit further comprises a stop peg that extends transversely with respect to the deploying movement of the display unit and with the deploying movement of the display unit, can move in a longitudinal groove, one end of the groove forms the stop against which the stop peg abuts in the displaying position.

13. The display device as claimed in claim 1, wherein the first and second couplers and also the gearwheels and the intermediate wheel are arranged in the housing on that side of the display unit which faces away from the housing opening.

14. The display device as claimed claim 8, wherein the spring drive is a torsion spring drive.

\* \* \* \* \*